United States Patent
Hansen et al.

(10) Patent No.: US 12,049,125 B1
(45) Date of Patent: *Jul. 30, 2024

(54) SYSTEMS AND METHODS FOR AUTOMATIC DEPLOYMENT OF SELF-INFLATABLE VEHICLE COVERING APPARATUS

(71) Applicant: United Services Automobile Association (USAA), San Antonio, TX (US)

(72) Inventors: Gregory David Hansen, Helotes, TX (US); Andre Rene Buentello, San Antonio, TX (US); Manfred Amann, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/311,200

(22) Filed: May 2, 2023

Related U.S. Application Data

(63) Continuation of application No. 17/502,012, filed on Oct. 14, 2021, now Pat. No. 11,673,461, which is a continuation of application No. 16/357,117, filed on Mar. 18, 2019, now Pat. No. 11,173,774, which is a continuation of application No. 15/801,170, filed on Nov. 1, 2017, now abandoned.

(60) Provisional application No. 62/417,418, filed on Nov. 4, 2016.

(51) Int. Cl.
*B60J 11/00* (2006.01)
*B60J 11/04* (2006.01)
*E04H 15/06* (2006.01)
*E04H 15/20* (2006.01)

(52) U.S. Cl.
CPC ............... *B60J 11/04* (2013.01); *E04H 15/06* (2013.01); *E04H 2015/201* (2013.01)

(58) Field of Classification Search
CPC ..... B60J 11/04; E04H 15/06; E04H 2015/201
See application file for complete search history.

(56) References Cited

U.S. PATENT DOCUMENTS

| | | | | |
|---|---|---|---|---|
| 5,902,003 A | * | 5/1999 | Malin | B60J 11/00 296/136 |
| 7,360,820 B2 | | 4/2008 | Tellez | |
| 9,493,250 B2 | | 11/2016 | Wang | |

(Continued)

FOREIGN PATENT DOCUMENTS

CN 103479007 A * 1/2014 ............. A45B 25/14

OTHER PUBLICATIONS

Rikard Fredriksson, Mikael Dahlgren, Margriet van Schijndel, Stefanie de Hair & Sjef van Montfort (2014) A Real-Life Based Evaluation Method of Deployable Vulnerable Road User Protection Systems, Traffic Injury Prevention, 15:sup1, S183-S189, DOI: 10.1080/15389588.2014.928930 (Year: 2014).*

(Continued)

*Primary Examiner* — Elaine Gort
*Assistant Examiner* — Brittany Renee Peko
(74) *Attorney, Agent, or Firm* — Perkins Coie LLP

(57) ABSTRACT

Systems and methods described in this disclosure provide methods and systems for automatic deployment of a vehicle covering apparatus to protect the vehicle from environmental conditions such as severe weather.

17 Claims, 9 Drawing Sheets

(56) References Cited

U.S. PATENT DOCUMENTS

| | | |
|---|---|---|
| 9,533,558 B2 | 1/2017 | Suh |
| 11,173,774 B1 | 11/2021 | Hansen et al. |
| 11,230,175 B2 | 1/2022 | Dawson |
| 2006/0260665 A1 | 11/2006 | Teshima et al. |
| 2017/0166041 A1* | 6/2017 | Sajedi .................... B60J 11/04 |
| 2017/0210216 A1 | 7/2017 | Yakubu |
| 2018/0043760 A1 | 2/2018 | Sarhan |

OTHER PUBLICATIONS

U.S. Appl. No. 17/502,012, filed Oct. 14, 2021, Systems and Methods for Automatic Deployment of Self-Inflatable Vehicle Covering Apparatus.

U.S. Appl. No. 16/357,117 U.S. Pat. No. 11,173,774, filed Mar. 18, 2019 Nov. 16, 2021, Systems and Methods for Automatic Deployment of Self-Inflatable Vehicle Covering Apparatus.

U.S. Appl. No. 15/801,170, filed Nov. 1, 2017, Systems and Methods for Automatic Deployment of Self-Inflatable Vehicle Covering Apparatus.

* cited by examiner

SYSTEMS AND METHODS FOR AUTOMATIC DEPLOYMENT OF SELF-INFLATABLE VEHICLE COVERING APPARATUS

CROSS-REFERENCE TO RELATED APPLICATIONS

This application is a continuation of U.S. patent application Ser. No. 17/502,012 filed Oct. 14, 2021, now allowed, which is a continuation of U.S. patent application Ser. No. 16/357,117 filed Mar. 18, 2019, issued as U.S. Pat. No. 11,173,774 on Nov. 16, 2021, entitled "SYSTEMS AND METHODS FOR AUTOMATIC DEPLOYMENT OF SELF-INFLATABLE VEHICLE COVERING APPARATUS," which is a continuation of U.S. patent application Ser. No. 15/801,170, filed on Nov. 1, 2017, entitled "SELF-INFLATABLE SYSTEMS FOR COVERING VEHICLES AND ASSOCIATED METHODS," which is a non-provisional of and claims priority to U.S. Provisional Application No. 62/417,418, filed on Nov. 4, 2016, entitled "SELF-INFLATABLE SYSTEMS FOR COVERING VEHICLES AND ASSOCIATED METHODS," all of which are hereby incorporated by reference in their entireties for all purposes.

TECHNICAL FIELD

Various embodiments of the present disclosure generally relate to covering a vehicle. More specifically, various embodiments of the present disclosure relate to systems and methods for covering or protecting a vehicle from environmental conditions or impacts.

BACKGROUND

Insurance companies often base vehicle insurance rates on numerous risk factors, such as driving history, age, type of vehicle, amount of coverage, and location. The more risk the insurance company incurs by insuring the vehicle, the higher the premium. Some factors are environmental factors/conditions and cannot be controlled by the insured. For example, insurance is more expensive in certain states because more severe weather events occur in those states.

BRIEF DESCRIPTION OF THE DRAWINGS

Embodiments of the present disclosure will be described and explained through the use of the accompanying drawings in which.

DETAILED DESCRIPTION

Figure 1A:
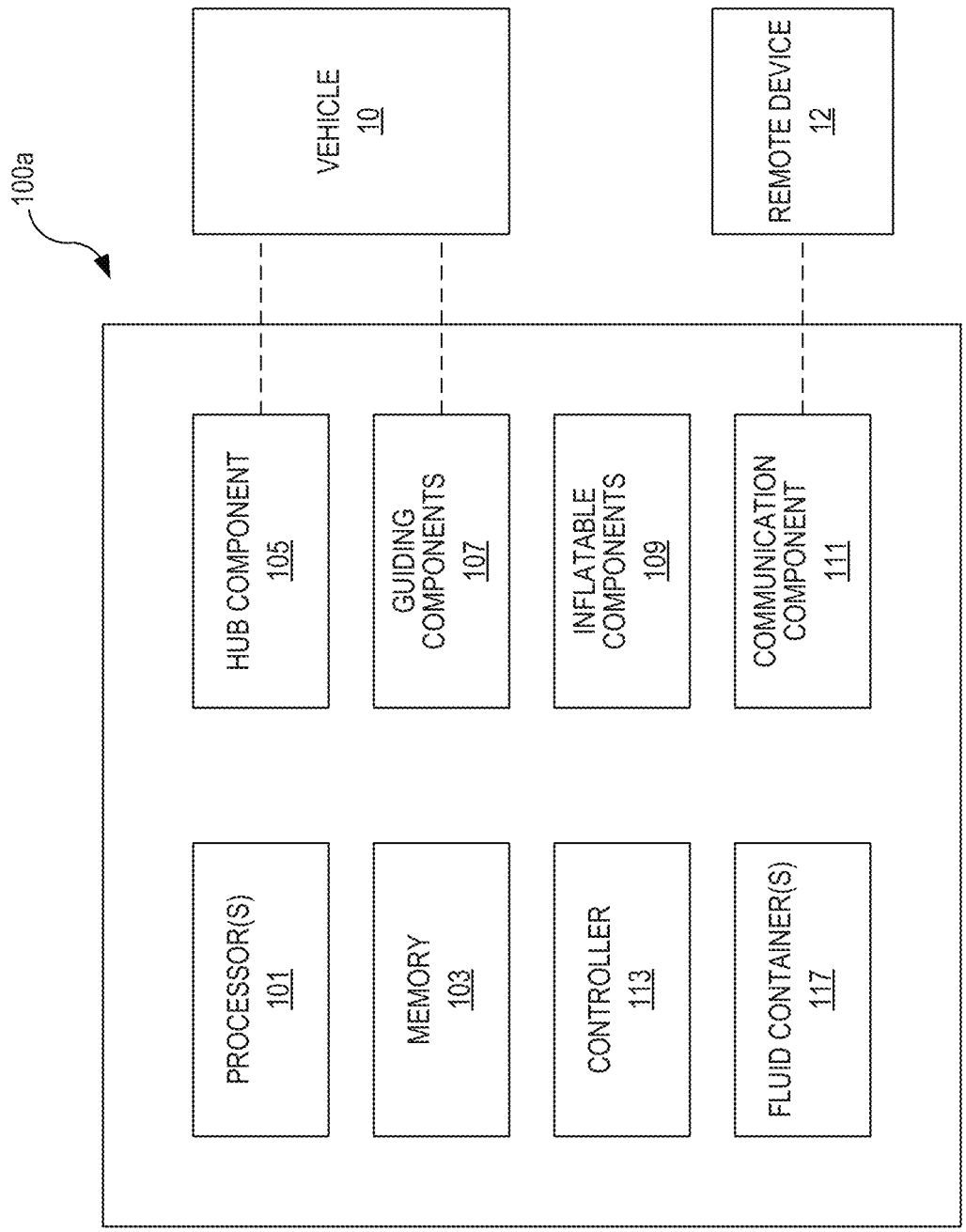
FIG. 1A is a schematic block diagram illustrating a system in accordance with various embodiments of the disclosure.

Various embodiments of the present disclosure generally relate to covering or protecting a vehicle. More specifically, various embodiments of the present disclosure relate to methods and systems for covering or protecting a vehicle from environmental conditions or impacts.

Traditionally, in order for a user to protect his or her vehicle from outside impacts or environmental conditions, the user needs to manually cover his/her vehicle. It is sometimes inconvenient or impossible for the user to protect the vehicle because he or she may not always be within the proximity of the vehicle when he/she needs to deploy a cover to protect the vehicle. In addition, in cases where a severe weather event happens unexpectedly, a user may not have sufficient reaction time to properly install a vehicle cover. Therefore, it is advantageous to have an improved system that can effectively provide proper coverage to a vehicle in an efficient fashion.

Embodiments of this disclosure provide a system that can effectively cover a vehicle so as to prevent the vehicle from damages that may be caused by an environmental event (e.g., severe weather) or other outside impacts. The system can include a hub component that can be positioned on a surface of the vehicle. The system can further include a plurality of guiding components and corresponding inflatable components coupled to the guiding components. The design of the guiding and inflatable components can be based at least in part on the dimension of the vehicle such that they can effectively protect the vehicle. When the system is not in operation, the guiding and inflatable components can be positioned inside the hub component. When an environmental condition is detected or when the system receives an instruction from an operator, the system can deploy the guiding components to circumferentially surround the vehicle and then inflate the inflatable components so as to properly cover at least a portion of the vehicle.

In some embodiments, the guiding components can be pre-deployed on a vehicle. For example, the guiding components can be attached to the vehicle via a track component such as a guiding track. In such embodiments, when a user chooses to deploy the guiding components, the system and/or user can move the guiding components along the track component to the proper positions. In some embodiments, the present disclosure enables a user to manually deploy the guiding components. For example, the guiding components can be attached to the vehicle via a strap by which the user can move (e.g., pull) and position the guiding components to the proper locations. In other embodiments, the user can send a command to the hub component to automatically deploy the guiding components.

Once the guiding components are properly positioned, the system can position the inflatable components between adjacent guiding components and then inflate the inflatable components. The inflated inflatable components can provide suitable coverage and protection to the vehicle from outside impacts, including weather conditions. In some embodiments, the inflatable components can include one or more openings or slits that enable wind or water to pass. By this arrangement, the inflated inflatable components do not need to bear too much air/water pressure which may occasionally move the vehicle in an undesirable direction or damage the vehicle. In addition, this arrangement can also prevent the system from being damaged by excessive air/water pressure.

This disclosure generally describes vehicle protection systems and methods for manufacturing and deploying such systems. Various embodiments may provide one or more of the following technological improvements: 1) improved systems that can provide effective protection of a vehicle without requiring manual installation; 2) improved systems that enable a user to effectively monitor and protect a vehicle from an environmental condition via a network; 3) improved methods for deploying a protection system on a vehicle; and 4) improved methods for manufacturing a protection system for a vehicle.

In the following description, for the purposes of explanation, numerous specific details are set forth in order to provide a thorough understanding of embodiments of the present disclosure. However, it will be apparent on reading the disclosure to one skilled in the art that embodiments may be practiced without some of these specific details.

Moreover, the techniques introduced here can be embodied as special-purpose hardware (e.g., circuitry), as programmable circuitry appropriately programmed with software and/or firmware, or as a combination of special-purpose and programmable circuitry. Hence, embodiments may include a machine-readable medium having stored thereon instructions that may be used to program a computer (or other electronic devices) to perform a process. The machine-readable medium may include, but is not limited to, floppy diskettes, optical disks, compact disc read-only memories (CD-ROMs), magneto-optical disks, ROMs, random access memories (RAMs), erasable programmable read-only memories (EPROMs), electrically erasable programmable read-only memories (EEPROMs), magnetic or optical cards, flash memory, or other types of media/machine-readable mediums suitable for storing electronic instructions.

FIG. 1A is a schematic block diagram illustrating a system 100a in accordance with various embodiments of the disclosure. As shown in FIG. 1A, the system 100a includes processor(s) 101, a memory 103, a hub component 105, a plurality of guiding components 107, a plurality of inflatable components 109, a communication component 111, a controller 113, and a fluid container 117. The system 100a can be attached to a vehicle 10. In some embodiments, the system 100a is permanently or fixedly attached to the vehicle 10. For example, the system 100a can be attached to the vehicle 10 via bolts and nuts. As another example, the system 100a can be attached to the vehicle 10 by a welding process. In some embodiments, the system 100a is temporarily attached to the vehicle 10. For example, the system 100a can be attached to the vehicle 10 via a magnetic component. As another example, the system 100a can be attached to the vehicle 10 via suitable adhesives.

The processor 101 is configured to control, send instructions to, process information/data from, and/or interact with other components in the system 100a. The memory 103 can be any device, mechanism, or populated data structure used for storing information. In accordance with some embodiments of the present disclosure, the memory 103 can encompass, but is not limited to, any type of volatile memory, nonvolatile memory, and/or dynamic memory. For example, the memory 103 can be random access memory, memory storage devices, optical memory devices, magnetic media, floppy disks, magnetic tapes, hard drives, SIMMs, SDRAM, DIMMs, RDRAM, DDR RAM, SODIMMS, EPROMs, EEPROMs, compact discs, DVDs, and/or the like. In accordance with some embodiments, the memory 103 may include one or more disk drives, flash drives, one or more databases, one or more tables, one or more files, local cache memories, processor cache memories, relational databases, flat databases, and/or the like. In addition, those of ordinary skill in the art will appreciate many additional devices and techniques for storing information that can be used as the memory 103. In some embodiments, the memory 103 may be used to store instructions for running one or more applications or modules on the processor 101. For example, the memory 103 could be used in one or more embodiments to house all or some of the instructions needed to control or communicate with the hub component 105, the guiding components 107, the inflatable components 109, the communication component 111, the controller 113, and the fluid container 117.

The hub component 105 can be configured to accommodate other components of the system 100a and can be directly attached on a suitable surface of the vehicle 10. In particular embodiments, the hub component 105 can include one or more housing elements (e.g., an upper housing and a lower housing). In some embodiments, the hub component 105 is formed or shaped with some aerodynamic characteristics (e.g., low drag coefficient) such that the hub component 105 can be carried by the vehicle 10 without causing undue burden on the vehicle 10. The size or dimensions of the hub component 105 can be determined by the numbers, shapes, and sizes of the components to be stored in the hub component 105. For example, the numbers, shapes and sizes of the guiding components 107, the inflatable components 109, the controller 113, the communication component 111, and/or the fluid container 117 are factors to consider when determining the actual dimensions of the hub component 105. In particular embodiments, the hub component 105 is configured to be positioned on a top surface (e.g., rooftop) of the vehicle 10. In other embodiments, however, the hub component 105 can be positioned on other suitable surfaces of the vehicle 10.

The guiding components 107 are configured to guide and support the inflatable components 109 when the system 100a is deployed on the vehicle 10. Embodiments of the guiding components 107 can include, for example, guide members, guide rails, straps, ropes, cables, and/or extendible, foldable mechanical arms. The guiding components 107 are operably (e.g., slideably) attached to the corresponding inflatable components 109. In particular embodiments, the guiding components 107 are attached to the inflatable components 109 via connecting components such as rings. When the system 100a is not deployed, the guiding components 107 and the inflatable components 109 are positioned or stored inside the hub component 105. In some embodiments, the guiding components 107 and the inflatable components 109 can be folded or stacked. One end of the guiding component 107 can be fixedly attached to the hub component 105.

The inflatable components 109 are configured to substantively cover the vehicle when the system 100a is deployed. In some embodiments, the inflatable components 109 can be made of plastic. In some embodiments, the inflatable components 109 can be made of other suitable materials. The inflatable components 109 are coupled to the controller 113 and the fluid container 117. The controller 113 is configured to initiate a process of directing compressed fluid stored in the fluid container 117 to the inflatable components 109 so as to inflate the inflatable components 109. In particular embodiments, the controller 113 can be a valve controller. In other embodiments, the controller 113 can be a flow regulator or other suitable devices. In particular embodiments, the compressed fluid can be compressed air such as compressed carbon dioxide. In such embodiments, the fluid container 117 can be a carbon-dioxide cartridge. In some embodiments, the system 100a can have more than one fluid container 117. In some embodiments, the inflatable components are not inflated until the guiding components reach a certain tension for safety purposes. That is, prior to inflating the inflatable components, the system checks the tension of the guiding components. When the guiding components reach a certain tension, then the inflatable components are inflated.

As shown in FIG. 1A, the system 100a can communicate with a remote device 12 via the communication component 111. In some embodiments, the communication component 111 can include a wireless component that is capable of transmitting and/or receiving wireless signals via a wireless network. In some embodiments, the remote device 12 can be a mobile device having a suitable computing system. In other embodiments, the remote device 12 can be integrated with the vehicle 10. Embodiments of the remote device 12 and the computing system will be discussed in detail with reference to FIGS. 4 and 6 below. By this arrangement, the system 100a enables a user to initiate a process of deploying the system 100a via the remote device 12. For example, when a user expects a severe weather condition, he/she can use the remote device 12 to "remotely" instruct the system 100a to initiate a deploying process.

When the system 100a receives an instruction from the user via the remote device 12, the system 100a can first check whether the components in the system 100a are positioned or functioning properly. If not, the system 100a can then send back an error message to the user. If so, the system 100a can then start to deploy the guiding components 107. As discussed above, one end (referred to as the first end) of the guiding component 107 is attached to the hub component 105. During deployment, the system 100a moves the other end (referred to as the second end) of the guiding component 107 to a predetermined location of the vehicle 10 and attaches it thereto. For example, in the embodiments in which the hub component 105 is positioned on the top surface of the vehicle 10, the system 100a moves the second end of the guiding components 107 to the bottom surface of the vehicle 10, and then attaches the second end of the guiding components 107 to an anchoring component positioned on the bottom surface of the vehicle 10. In particular embodiments, the anchoring component can be a hook. In some embodiments, the anchoring component can be a snap latch. In some embodiments, the attached the second end of the guiding components 107 can be attached to a side surface of the vehicle 10. In some embodiments, the guiding component 107 can be a self-guided component that can be moved in a pre-determined direction until it reaches a predetermined location. For example, the guiding component 107 can be a particularly-shaped telescopic rod.

After deployment, the guiding components 107 circumferentially surround the vehicle 10. In some embodiments, the guiding components 107 can only surround or cover a portion of the vehicle 10 (e.g., a front windshield portion, a side window portion, a rear window portion, etc.). Once the guiding components 107 are properly deployed, the system 100a then moves the inflatable components 109 and positions them in between the guiding components 107. The system 100a then instructs the controller 113 to direct fluid from the fluid container 117 to inflate the deployed inflatable components 109. The inflated inflatable components 109 then substantially cover the vehicle 10 and accordingly provide desirable protection or coverage to the vehicle 10.

Figure 1B:
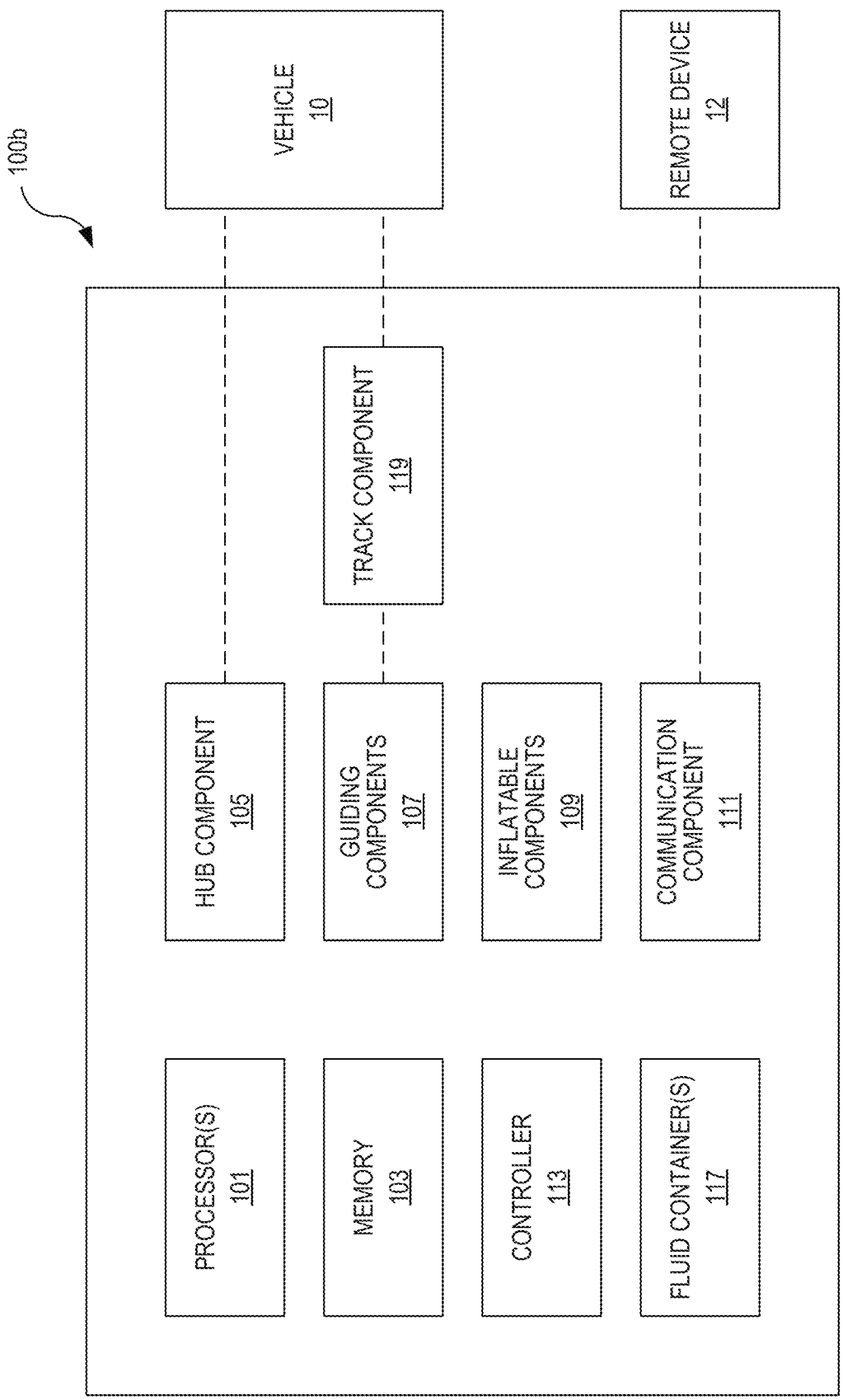
FIG. 1B is a schematic block diagram illustrating another system in accordance with various embodiments of the disclosure.

FIG. 1B is a schematic block diagram illustrating another system 100b in accordance with various embodiments of the disclosure. Compared to the system 100a described in FIG. 1A, the system 100b further includes a track component 119 that is configured to facilitate deploying the guiding components 107. Embodiments of the track component 119 include a guiding rail, a cable, a robe, a strap, etc. In such embodiments, the guiding components 107 can be moved by the system 100b along the pre-installed track component 119. In some embodiments, the guiding component 107 can be moved by a motor. In some embodiments, the guiding component 107 can be manually moved by a nearby operator by pulling a strap attached thereto.

Figure 1C:
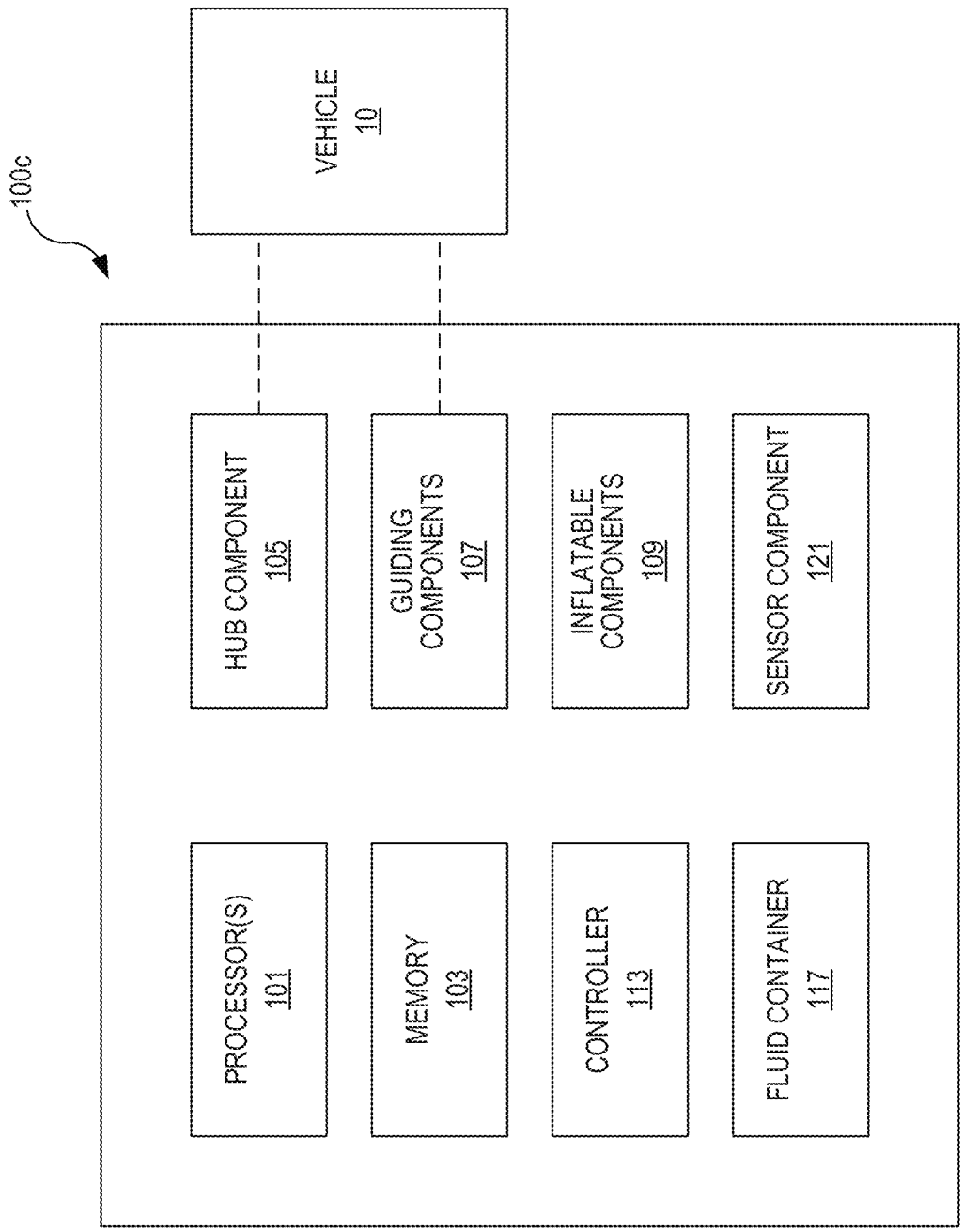
FIG. 1C is a schematic block diagram illustrating another system in accordance with various embodiments of the disclosure.

FIG. 1C is a schematic block diagram illustrating yet another system 100c in accordance with various embodiments of the disclosure. As compared to the system 100a described in FIG. 1A, rather than having the communication component 111 configured to communicate with the remote device 12, the system 100c includes a sensor component 121 that is configured to measure ambient information surrounding the vehicle 10. In such embodiments, when the sensor component 121 detects a predetermined event (e.g., a particular weather condition such as a wind gust, hail storm, humidity level, snow, etc.), the system 100c can initiate a deployment process for the guiding components 107 and the inflatable components 109 so as to protect the vehicle 10. In particular embodiments, the sensor component 121 can include a motion sensor, an impact sensor, a wind sensor, a precipitation sensor, or other suitable sensors.

Figure 2A:
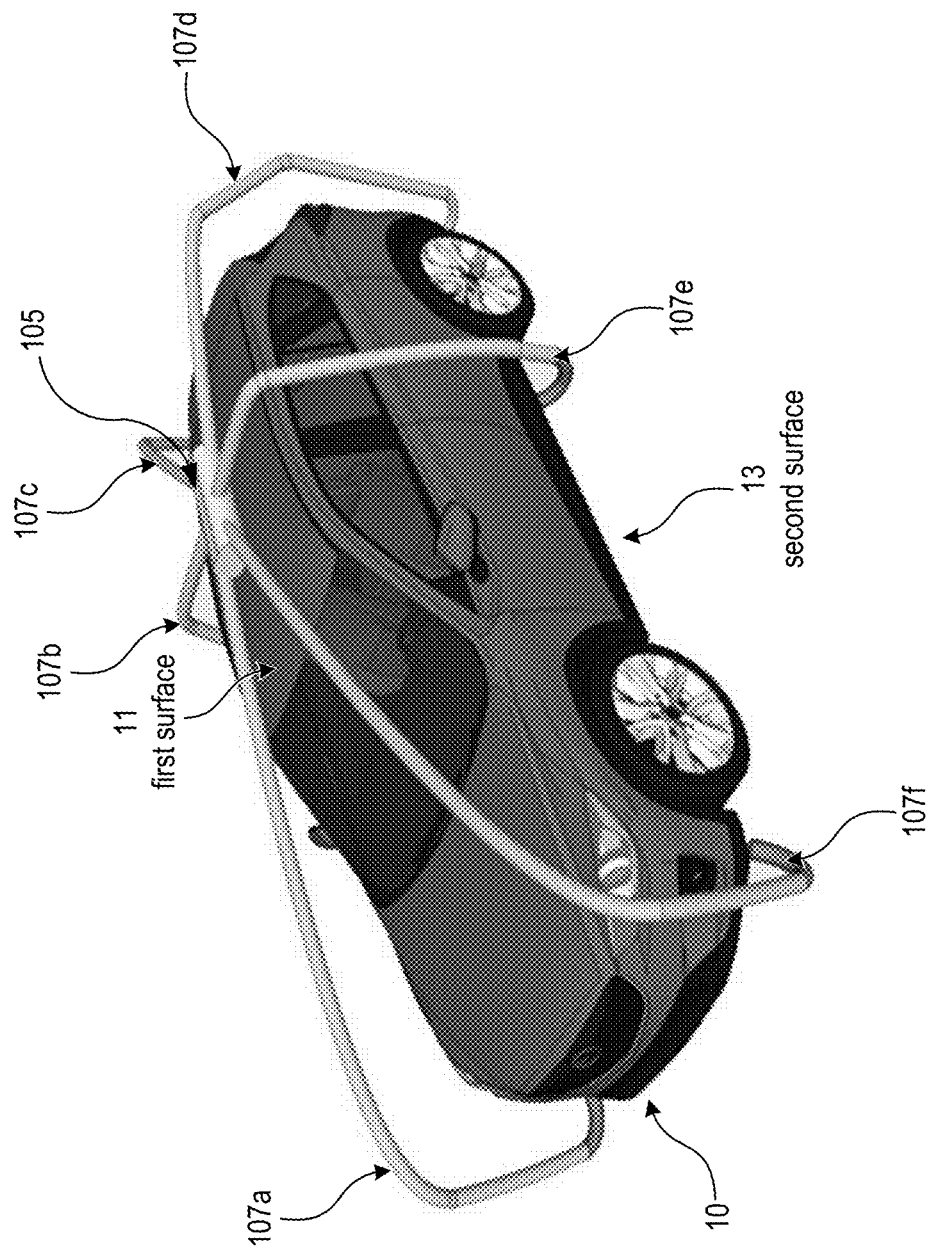
FIGS. 2A and 2B are schematic diagrams illustrating various components of a system in accordance with one or more embodiments of the disclosure.
Figure 2B:
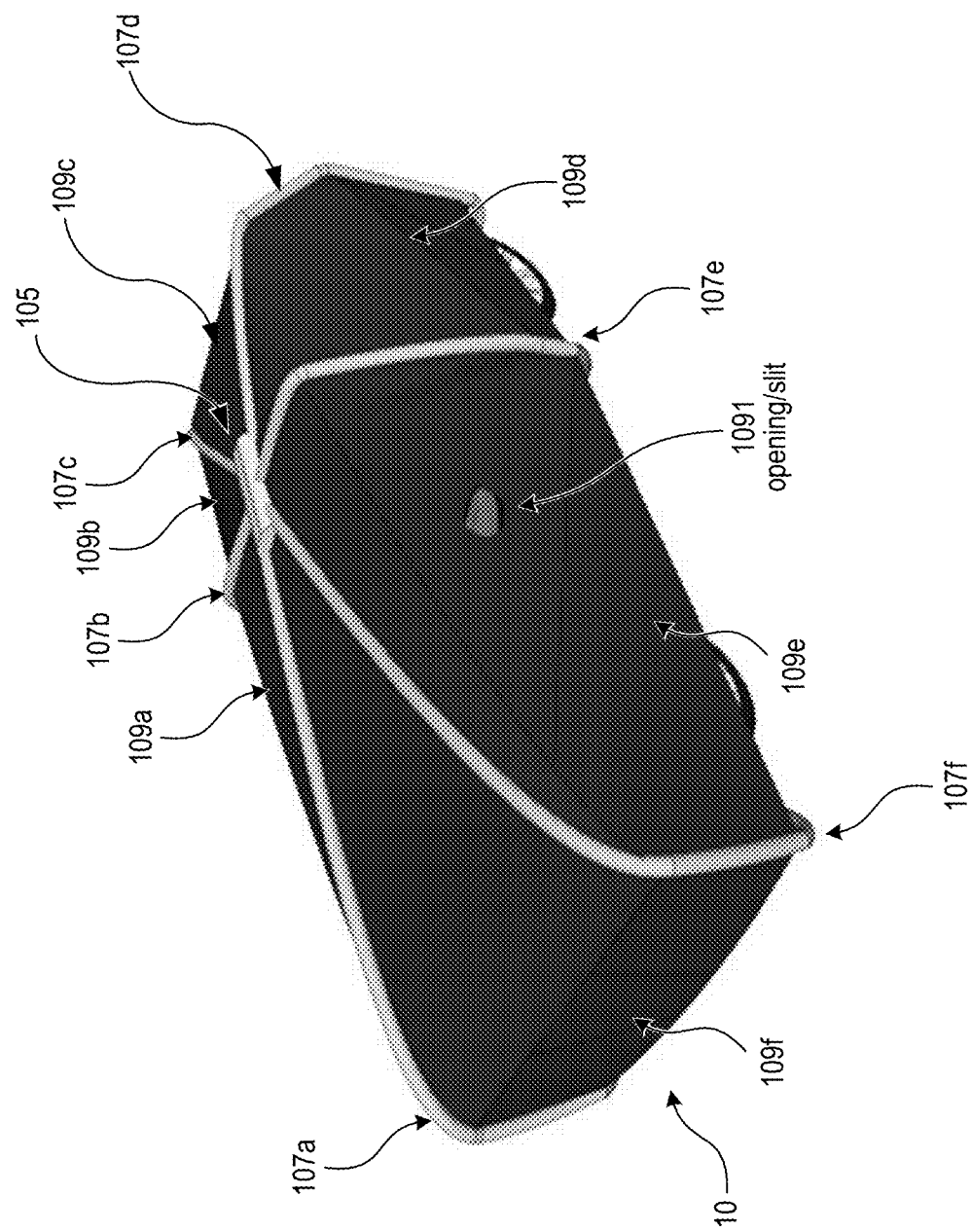

FIGS. 2A and 2B are schematic diagrams illustrating various components of a system in accordance with one or more embodiments of the disclosure. FIGS. 2A and 2B illustrate the deployment of the system in accordance with the present disclosure. As shown in FIG. 2A, the hub component 105 is positioned on the top surface or the first surface of the vehicle 10. The system described in FIG. 2A includes six guiding components 107a-f. In other embodiments, the system can have different numbers of guiding components depending on various designs. As shown, for each of the guiding components 107a-f, one end (first end) is attached to the hub component 105 positioned on the top (first) surface of the vehicle, and the other end (second end) is attached to the bottom (second) surface 13 of the vehicle 10. The six guiding components 107a-f are arranged to circumferentially surround the vehicle 10 while not substantially interfering with the normal operation of the vehicle 10. For example, the guiding components 107a-f are positioned not to prevent the doors of the vehicles from opening/closing, or not to hinder a driver's ability to see through the windshield/windows while driving (e.g., a driver's line of slight is not blocked by the system).

In FIG. 2B, the system includes six inflatable components 109a-f that are positioned between adjacent guiding components 107a-f. By this arrangement, the inflatable components 109a-f can substantially cover the whole vehicle 10 and accordingly provide suitable protection thereto. In some embodiments, the inflatable components 109 can only cover a specific portion of a vehicle (e.g., windows, windshields, etc.). In the illustrated embodiments, the inflatable component 109e can include an opening 1091 that enables a side mirror of the vehicle 10 to pass. The opening 1091 can also function as a pressure regulator that can adjust the air/fluid pressure inside and outside the inflatable component 109a-f, so as to enhance the durability of the system.

Figure 3:
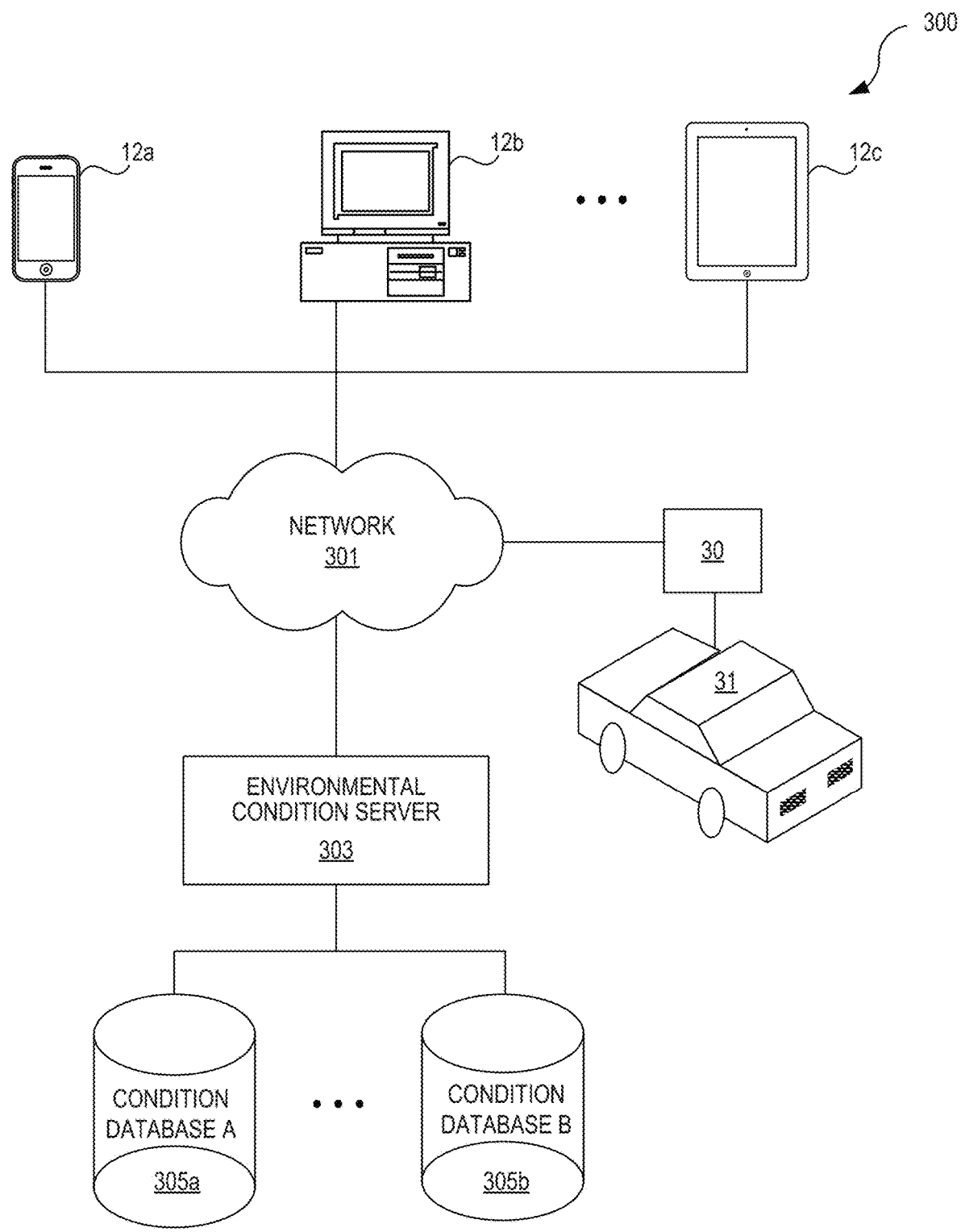
FIG. 3 is a schematic block diagram illustrating a system in accordance with various embodiments of the disclosure.

FIG. 3 is a schematic block diagram illustrating a system 300 in accordance with various embodiments of the disclosure. The system 300 enables a user to deploy a vehicle protection system 30 (e.g., the systems 100a, 100b, or 100c described above) coupled to a vehicle 31 via a network 301. In some embodiments, the network 301 can be a wireless network such as a Wi-Fi network, a 3G/4G network, or other suitable networks. In some embodiments, the network 301 can be a wired network. In some embodiments, the network 301 can be any combination of local area and/or wide area networks, using wired and/or wireless communication systems. The network 301 can be or could use any or more protocols/technologies: Ethernet, IEEE 802.11 or Wi-Fi, worldwide interoperability for microwave access (WiMAX), cellular telecommunication (e.g., 3G, 4G, 5G), CDMA, cable, digital subscriber line (DSL), etc. Similarly, the networking protocols used on the network 301 may include multiprotocol label switching (MPLS), transmission control protocol/Internet protocol (TCP/IP), User Datagram Protocol (UDP), hypertext transport protocol (HTTP), simple mail transfer protocol (SMTP) and file transfer protocol (FTP). Data exchanged over the network 301 may be represented using technologies, languages, and/or formats including hypertext markup language (HTML) or extensible markup language (XML). In addition, all or some links can be encrypted using conventional encryption technologies such as secure sockets layer (SSL), transport layer security (TLS), and Internet Protocol security (IPsec).

As shown, the vehicle protection system 30 is connected to multiple remote devices 12a-c via the network 301. In the illustrated embodiment, the remote device 12a includes a mobile phone, the remote device 12b includes a personal computer, and the remote device 12c includes a tablet computer. The remote devices 12a-c and the vehicle protection system 30 are also connected to an environment condition server 303, which is further connected to condition databases A and B. In the illustrated embodiment, the condition database 305a is a government database, and the condition database 305b is a private database (e.g., a commercial database). The environment condition server 303a is configured to provide the remote devices 12a-c and the vehicle protection system 30 with information regarding current or updated environmental conditions or events. Examples of the environmental conditions or events include severe weather forecast in a specific area, real-time monitored weather conditions at a certain location, and an air quality index in a particular region (e.g., an environment may contain a high concentration of a specific type of air pollutant that could potentially cause damages to a vehicle). In some embodiments, the environment condition server 303 can provide such environmental condition information based on a user inquiry (e.g., a user can input his or her inquiry via the remote device 12a-c). In some embodiments, the environment condition server 303 can periodically generate such information and send the generated information to a user.

Once a user receives the generated environmental condition information via the remote devices 12a-c, he or she can remotely instruct the vehicle protection system 30 to initiate a deployment process (e.g., deploying the guiding components 107 and the inflatable components 109, as discussed above) so as to protect or cover the vehicle 31. For example, a user can instruct the vehicle protection system 30 to initiate a deployment process when there is a weather forecast saying that there will be a hail storm coming in the place where the vehicle 31 is located in one hour. As another example, a user can authorize the vehicle protection system 30 to initiate a deployment process when a sensor coupled to the vehicle 31 detects a precipitation event. In some embodiments, the vehicle and/or the vehicle protection system 30 can receive the environmental condition information directly and automatically initiate the deployment process based on one or more pre-determined rules.

Figure 4:
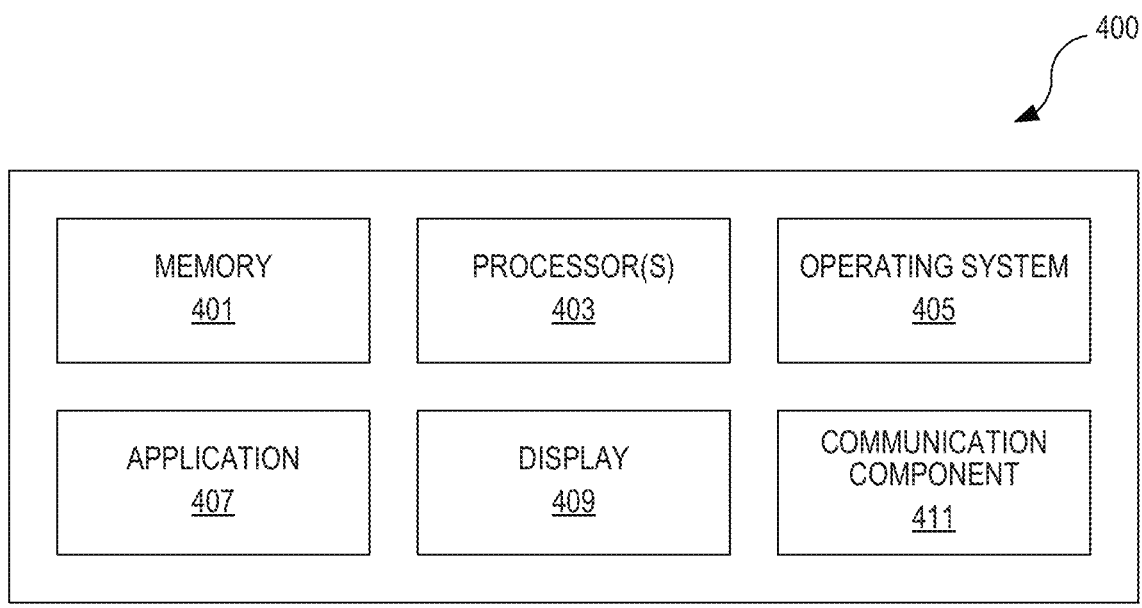
FIG. 4 is a schematic block diagram illustrating a remote device in accordance with various embodiments of the disclosure.

FIG. 4 is a schematic block diagram illustrating a remote device 400 in accordance with various embodiments of the disclosure. Examples of the remote device 400 include a mobile device, a mobile phone, a telephone, a tablet computer, a mobile media device, a mobile gaming device, a vehicle-based computer, a dedicated terminal, a public terminal, a desktop computer, a laptop computer, a kiosk, a wearable device such as a smartwatch, etc. As shown, the remote device 400 includes a memory 401, a processor 403, an operating system 405, an application 407, a display 409, and a communication component 411. Other embodiments of the present disclosure may include some, all, or none of these modules and components along with other modules, applications, and/or components. Still yet, some embodiments may incorporate two or more of these modules and components into a single module and/or associate a portion of the functionality of one or more of these modules with a different module. For example, in one embodiment, the application 407 and the display 409 can be combined into a single component.

The processor 403 is coupled to and configured to control other components of the remote device 400. The memory 401 can be any device, mechanism, or populated data structure used for storing information. In accordance with some embodiments of the present disclosure, the memory 401 can encompass, but is not limited to, any type of volatile memory, nonvolatile memory, and dynamic memory. For example, the memory 401 can be random access memory, memory storage devices, optical memory devices, magnetic media, floppy disks, magnetic tapes, hard drives, SIMMs, SDRAM, DIMMs, RDRAM, DDR RAM, SODIMMS, EPROMs, EEPROMs, compact discs, DVDs, and/or the like. In accordance with some embodiments, the memory 401 may include one or more disk drives, flash drives, one or more databases, one or more tables, one or more files, local cache memories, processor cache memories, relational databases, flat databases, and/or the like. In addition, those of ordinary skill in the art will appreciate many additional devices and techniques for storing information that can be used as the memory 401. The memory 401 may be used to store instructions for running one or more applications or components on the processor 403. For example, the memory 401 could be used in one or more embodiments to house all or some of the instructions needed to execute the functionality of the operating system 405, the application 407, the display 409, and the communications component 411.

The operating system 405 can provide a software package that is capable of managing the hardware resources of the remote device 400. The operating system 405 can also provide common services for software applications running on the processor 403. In accordance with various embodiments, the operating system 405 can coordinate resources for multiple applications 407 that allow a user to access and interact with the vehicle protection system 30 discussed above with reference to FIG. 3. For example, the application 407 can include an application for initiating a deployment process of a vehicle or setting the associated rules thereof. The display 409 can generate one or more graphical user interface (GUI) screens that allow for interaction with a user of the demote device 400. The communications component 411 can communicate with the vehicle (e.g., vehicle 31) and/or a server or other system (e.g., the environmental condition server 303).

Figure 5:
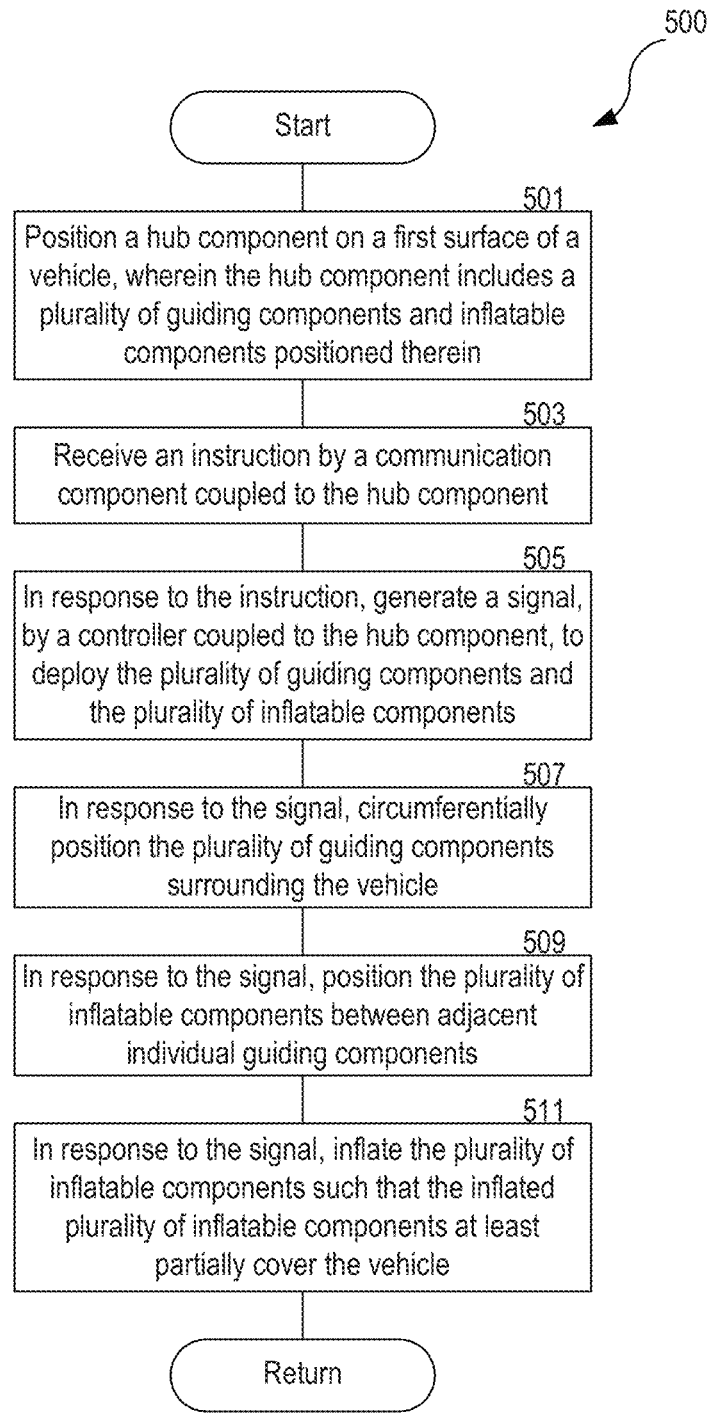
FIG. 5 is a flowchart illustrating a method in accordance with various embodiments of the disclosure.

FIG. 5 is a flowchart illustrating a method 500 in accordance with various embodiments of the disclosure. The method 500 starts at operation 501 by positioning a hub component on a first surface of a vehicle. The hub component includes a plurality of guiding components and inflatable components positioned therein. At operation 503, the method 500 continues to receive an instruction by a communication component coupled to the hub component. In response to the instruction, the method 500 then continues to operation 505, and a controller coupled to the hub component generates a signal to deploy the plurality of guiding components and the plurality of inflatable components. At operation 507, in response to the signal, the method 500 then circumferentially positions the plurality of guiding components surrounding the vehicle. At operation 509, the method 500 then, in response to the signal, positions the plurality of inflatable components between adjacent individual guiding components. At operation 511, the method continues by inflating the plurality of inflatable components such that the inflated inflatable components can at least partially cover the vehicle. The method 500 then returns to await further instructions.

Computer System Overview

Figure 6:
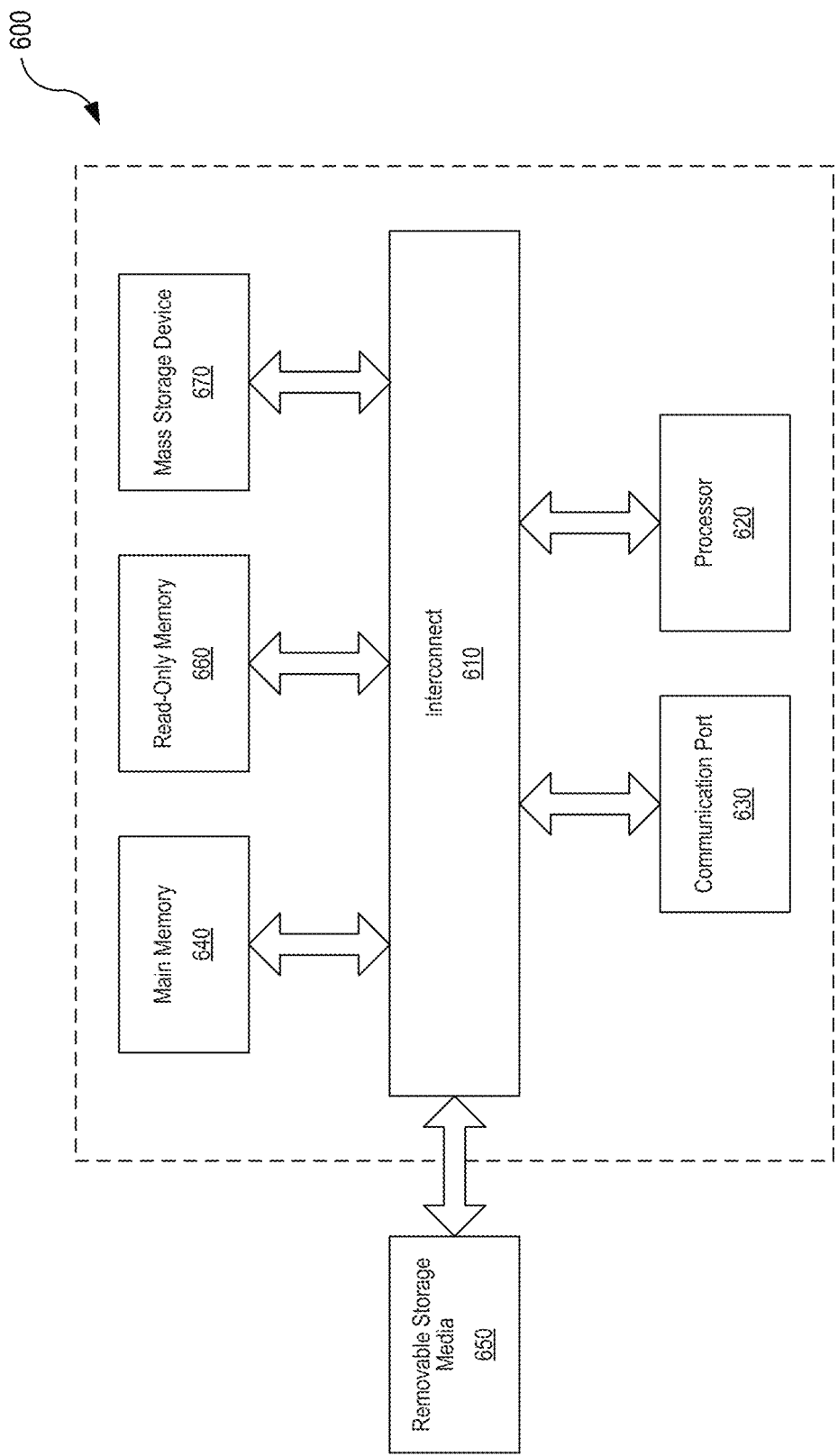
FIG. 6 illustrates an example of a computer system with which some embodiments of the present disclosure may be utilized.

Embodiments of the present disclosure include various steps and operations, which have been described above. A variety of these steps and operations may be performed by hardware components or may be embodied in machine-executable instructions, which may be used to cause a general-purpose or special-purpose processor programmed with the instructions to perform the steps. Alternatively, the steps may be performed by a combination of hardware, software, and/or firmware. As such, FIG. 6 is an example of a computer system 600 with which embodiments of the present disclosure may be utilized. According to the present example, the computer system includes an interconnect 610, at least one processor 620, at least one communication port 630, a main memory 640, a removable storage media 650, a read-only memory 660, and a mass storage 670.

The processor(s) 620 can be any known processor, such as, but not limited to, an Intel® Itanium® or Itanium 2® processor(s), or AMD® Opteron® or Athlon MP® processor(s), or Motorola® lines of processors. The communication port(s) 630 can be any of an RS-232 port for use with a modem-based dial-up connection, a 10/100 Ethernet port, or a Gigabit port using copper or fiber. The communication port(s) 630 may be chosen depending on a network such as a Local Area Network (LAN), Wide Area Network (WAN), or any network to which the computer system 600 connects.

The main memory 640 can be Random Access Memory (RAM) or any other dynamic storage device(s) commonly known in the art. The read-only memory 660 can be any static storage device(s), such as programmable read-only memory (PROM) chips for storing static information, such as instructions for the processor 620.

The mass storage 670 can be used to store information and instructions. For example, hard disks such as the Adaptec® family of SCSI drives, an optical disc, an array of disks such as RAID, the Adaptec family of RAID drives, or any other mass storage devices may be used.

The interconnect 610 communicatively couples the processor(s) 620 with the other memory, storage, and communication blocks. The interconnect 610 can be a PCI/PCI-X- or SCSI-based system bus, depending on the storage devices used.

The removable storage media 650 can be any kind of external hard-drives, floppy drives, IOMEGA® Zip Drives, compact disc read-only memory (CD-ROM), compact disc re-writable (CD-RW), or digital video disc read-only memory (DVD-ROM).

The components described above are meant to exemplify some types of possibilities. In no way should the aforementioned examples limit the disclosure, as they are only exemplary embodiments.

Terminology

Brief definitions of terms, abbreviations, and phrases used throughout this application and the appendices are given below.

The terms "connected" or "coupled" and related terms are used in an operational sense and are not necessarily limited to a direct physical connection or coupling. Thus, for example, two devices may be coupled directly or via one or more intermediary media or devices. As another example, devices may be coupled in such a way that information can be passed therebetween, while not sharing any physical connection with one another. Based on the disclosure provided herein, one of ordinary skill in the art will appreciate a variety of ways in which connection or coupling exists in accordance with the aforementioned definition.

The phrases "in some embodiments," "in other embodiments," "embodiments," and the like generally mean that the particular feature, structure, or characteristic following the phrase is included in at least one embodiment of the present disclosure and may be included in more than one embodiment of the present disclosure. In addition, such phrases do not necessarily refer to the same embodiments or to different embodiments.

If the specification states a component or feature "may," "can" or "could" be included or have a characteristic, that particular component or feature is not required to be included or have the characteristic.

The term "responsive" or "in response" includes completely or partially responsive.

The term "component" refers broadly to a software, hardware, or firmware (or any combination thereof) element. Components are typically functional elements that can generate useful data or other output using specified input(s). A component may or may not be self-contained. An application program (also called an "application") may include one or more component, or a component can include one or more application programs.

The term "network" generally refers to a group of interconnected devices capable of exchanging information. A network may be as few as several personal computers on a Local Area Network (LAN) or as large as the Internet, a worldwide network of computers. As used herein, "network" is intended to encompass any network capable of transmitting information from one entity to another. In some cases, a network may be comprised of multiple networks, even multiple heterogeneous networks, such as one or more border networks, voice networks, broadband networks, financial networks, service provider networks, Internet Service Provider (ISP) networks, and/or Public Switched Telephone Networks (PSTNs) interconnected via gateways operable to facilitate communications between and among the various networks.

Also, for the sake of illustration, various embodiments of the present disclosure have herein been described in the context of computer programs, physical components, and logical interactions within modern computer networks. Importantly, while these embodiments describe various embodiments of the present disclosure in relation to modern computer networks and programs, the methods and apparatuses described herein are equally applicable to other systems, devices, and networks, as one skilled in the art will appreciate. As such, the illustrated applications of the embodiments of the present disclosure are not meant to be limiting, but instead are examples. Other systems, devices, and networks to which embodiments of the present disclosure are applicable include, but are not limited to, other types of communication and computer devices and systems. More specifically, embodiments are applicable to communication systems, services, and devices such as cell phone networks and compatible devices. In addition, embodiments are applicable to all levels of computing, from the personal computer to large network mainframes and servers.

In conclusion, the present disclosure discloses novel systems, methods, and arrangements for covering a vehicle. While detailed descriptions of one or more embodiments of the disclosure have been given above, various alternatives, modifications, and equivalents will be apparent to those skilled in the art without varying from the spirit of the disclosure. For example, while the embodiments described above refer to particular features, the scope of this disclosure also includes embodiments having different combinations of features and embodiments that do not include all of the described features. Accordingly, the scope of the present disclosure is intended to embrace all such alternatives, modifications, and variations as fall within the scope of the claims, together with all equivalents thereof. Therefore, the above description should not be taken as limiting.

What is claimed is:

1. A method for deploying a motorized vehicle covering apparatus coupled to a vehicle, wherein the motorized vehicle covering apparatus includes a hub component with a plurality of guiding components and at least one protective component, the method comprising:
receiving, at the hub component, a signal to check whether the plurality of guiding components and the at least one protective component of the hub component are functional;
determining, at the hub component, that the plurality of guiding components and the at least one protective component of the hub component are functional based on the plurality of guiding components being aligned with respective track components of one or more track components; and
in response to determining that the plurality of guiding components and the at least one protective component of the hub component are functional, deploying the motorized vehicle covering apparatus to cover at least a portion of the vehicle, wherein the deploying includes causing operation of the plurality of guiding components.

2. The method of claim 1, further comprising:
receiving an instruction to initiate a deployment process of the motorized vehicle covering apparatus to protect or to cover the vehicle.

3. The method of claim 1, further comprising:
detecting, via a sensor, a pre-determined environmental condition on the vehicle, wherein the sensor includes at least one of a motion sensor, an impact sensor, a wind sensor, or a precipitation sensor.

4. The method of claim 1, further comprising:
sending a command to inflate a plurality of inflatable components, wherein the plurality of inflatable components is inflated such that the inflated inflatable components at least partially cover the vehicle.

5. The method of claim 1, wherein the plurality of guiding components includes a plurality of cables, a plurality of ropes, or extendable, foldable mechanical arms, and wherein the plurality of guiding components are deployed to be circumferentially positioned surrounding the vehicle.

6. The method of claim 1, wherein the hub component includes one or more housing elements, and wherein the at least one protective component is an inflatable component.

7. A system comprising:
one or more processors; and
one or more memories storing instructions that, when executed by the one or more processors, cause the system to perform a process for deploying a motorized vehicle covering apparatus coupled to a vehicle, wherein the motorized vehicle covering apparatus includes a hub component with a plurality of guiding components and at least one protective component, the process comprising:
receiving, at the hub component, a signal to check whether the plurality of guiding components and the at least one protective component of the hub component are functional;
determining, at the hub component, that the plurality of guiding components and the at least one protective component of the hub component are functional based on the plurality of guiding components being aligned with respective track components of one or more track components; and
in response to determining that the plurality of guiding components and the at least one protective component of the hub component are functional, deploying the motorized vehicle covering apparatus to cover at least a portion of the vehicle, wherein the deploying includes causing operation of the plurality of guiding components.

8. The system according to claim 7, wherein the process further comprises:
receiving an instruction to initiate a deployment process of the motorized vehicle covering apparatus to protect or to cover the vehicle.

9. The system according to claim 7, wherein the process further comprises:
detecting, via a sensor, a pre-determined environmental condition on the vehicle, wherein the sensor includes at least one of a motion sensor, an impact sensor, a wind sensor, or a precipitation sensor.

10. The system according to claim 7, wherein the process further comprises:
sending a command to inflate a plurality of inflatable components, wherein the plurality of inflatable components is inflated such that the inflated inflatable components at least partially cover the vehicle.

11. The system according to claim 7, wherein the plurality of guiding components includes a plurality of cables, a plurality of ropes, or extendable, foldable mechanical arms, and wherein the plurality of guiding components are deployed to be circumferentially positioned surrounding the vehicle.

12. The system according to claim 7, wherein the hub component includes one or more housing elements, and wherein the at least one protective component is an inflatable component.

13. A non-transitory computer-readable medium storing instructions that, when executed by a computing system, cause the computing system to perform operations for deploying a motorized vehicle covering apparatus coupled to a vehicle, wherein the motorized vehicle covering apparatus includes a hub component with a plurality of guiding components and at least one protective component, the operations comprising:

receiving, at the hub component, a signal to check whether the plurality of guiding components and the at least one protective component of the hub component are functional;

determining, at the hub component, that the plurality of guiding components and the at least one protective component of the hub component are functional based on the plurality of guiding components being aligned with respective track components of one or more track components; and in response to determining that the plurality of guiding components and the at least one protective component of the hub component are functional, deploying the motorized vehicle covering apparatus to cover at least a portion of the vehicle, wherein the deploying includes causing operation of the plurality of guiding components.

14. The non-transitory computer-readable medium of claim 13, wherein the operations further comprise:

receiving an instruction to initiate a deployment process of the motorized vehicle covering apparatus to protect or to cover the vehicle.

15. The non-transitory computer-readable medium of claim 13, wherein the operations further comprise:

detecting, via a sensor, a pre-determined environmental condition on the vehicle, wherein the sensor includes at least one of a motion sensor, an impact sensor, a wind sensor, or a precipitation sensor.

16. The non-transitory computer-readable medium of claim 13, wherein the operations further comprise:

sending a command to inflate a plurality of inflatable components, wherein the plurality of inflatable components is inflated such that the inflated inflatable components at least partially cover the vehicle.

17. The non-transitory computer-readable medium of claim 13, wherein the plurality of guiding components includes a plurality of cables, a plurality of ropes, or extendable, foldable mechanical arms, and wherein the plurality of guiding components are deployed to be circumferentially positioned surrounding the vehicle.

* * * * *